(12) United States Patent
Apacible et al.

(10) Patent No.: US 8,768,971 B2
(45) Date of Patent: Jul. 1, 2014

(54) DISTRIBUTED DATA STORAGE

(75) Inventors: Johnson T. Apacible, Mercer Island, WA (US); Cezary Marcjan, Redmond, WA (US); Mark A. Nikiel, Redmond, WA (US); Michael W. Thomas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 12/403,350

(22) Filed: Mar. 12, 2009

(65) Prior Publication Data

US 2010/0235410 A1 Sep. 16, 2010

(51) Int. Cl.
*G06F 7/00* (2006.01)

(52) U.S. Cl.
USPC ........... 707/802; 707/812; 711/100; 711/170; 380/28; 380/210

(58) Field of Classification Search
USPC ........... 707/999.205, 802, 812; 711/100, 170; 380/28, 210
See application file for complete search history.

(56) References Cited

U.S. PATENT DOCUMENTS

| | | | | |
|---|---|---|---|---|
| 6,539,475 | B1 * | 3/2003 | Cox et al. | 713/100 |
| 6,587,634 | B2 | 7/2003 | Maltz et al. | |
| 2002/0003881 | A1 | 1/2002 | Reitmeier et al. | |
| 2007/0050590 | A1 | 3/2007 | Syed et al. | |
| 2007/0055538 | A1 * | 3/2007 | Burton | 705/2 |
| 2007/0160198 | A1 | 7/2007 | Orsini et al. | |
| 2008/0154961 | A1 * | 6/2008 | Dougall | 707/104.1 |
| 2008/0183992 | A1 | 7/2008 | Martin et al. | |
| 2009/0216796 | A1 * | 8/2009 | Slik et al. | 707/103 R |

OTHER PUBLICATIONS

Mills, et al., "SCAR—Scattering, Concealing and Recovering Data within a DHT", Proceedings of the 41st Annual Simulation Symposium, 2008, retrieved at <<http://ieeexplore.ieee.org/stamp/stamp.jsp?arnumber=04494403>>, Apr. 13-16, 2008, pp. 35-42.

Langheinrich, Marc, "FragDB—Secure Localized Storage Based on Super-Distributed RFID-Tag Infrastructures", International Conference on Mobile Data Management, 2007, retrieved at <<http://www.vs.inf.ethz.ch/publ/papers/langhein2007-fragdb.pdf>>, May 1, 2007, pp. 1-8.

(Continued)

*Primary Examiner* — Hosain Alam
*Assistant Examiner* — Jieying Tang
(74) *Attorney, Agent, or Firm* — Matt Sommer; Jim Ross; Micky Minhas

(57) ABSTRACT

In one example, data may be divided into blocks, and the blocks may be stored in various storage resources. Data to be stored may be provided to a data divider. The data divider may divide the data into blocks. Redundancy may be introduced into the blocks to allow the original data to be reconstructed at some point in the future, even if fewer than all of the original blocks are available. The blocks may be sent to a data shuffler, which may shuffle the blocks, and may provide a key that describes how to reconstruct the original data from the blocks. The key may be provided to the owner of the data. When the original data is to be retrieved, the key may be provided to a reassembler, which retrieves the blocks from the various storage resources and reconstructs the data using the key.

20 Claims, 5 Drawing Sheets

(56) References Cited

OTHER PUBLICATIONS

Chess, et al., "Security in an Autonomic Computing Environment", IBM Systems Journal, retrieved at <<http://www.research.ibm.com/journal/sj/421/chess.html>>, vol. 42, No. 1, Jan. 21, 2003, pp. 1-10.

Shanmugasundaram, et al., "Automatic Reassembly of Document Fragments via Context Based Statistical Models", Proceedings of the 19th Annual Computer Security Applications Conference, 2003, retrieved at <<http://www.acsa-admin.org/2003/papers/97.pdf>>, Dec. 8-12, 2003, pp. 1-8.

Pal, et al., "Automated Reassembly of Fragmented Images", Proceedings of the 2003 International Conference on Multimedia and Expo, retrieved at <<http://citeseerx.ist.psu.edu/viewdoc/summary?doi=10.1.1.10.8473>>, vol. 1, Jul. 6-9, 2003, 4 pages.

* cited by examiner

DISTRIBUTED DATA STORAGE

BACKGROUND

In the field of data storage, one challenge is to protect the data from unauthorized access and loss. For example, some people (or other entities) may attempt to access data that they are not authorized to access. Or, a device on which the data is stored may malfunction or get stolen, thereby resulting in loss of the data stored on that device.

Commercial expectations or a regulatory framework may call for some degree of protection against unauthorized access or loss. For example, when a company is in the business of storing data, the company's customers may expect the company to protect the privacy of the data, and to ensure that the data will be available for retrieval in the future. Medical data is one example of data that may be protected from unauthorized access or loss. Patients and healthcare providers—and often legal regulatory frameworks—expect that medical data will be kept private and will be guarded against loss.

Many systems that protect against unauthorized access and data loss have been inadequate.

SUMMARY

Data may be protected against unauthorized access and/or loss by dividing the data into portions, shuffling the data in or among the portions, and distributing the storage of different portions across different resources.

When data is to be stored, the data may be received by a data divider, which may divide the data into portions such as blocks. The portions are then provided to a shuffler, which shuffles the data in the portions. Shuffling may involve changing the placement of data within a portion, and/or swapping data between portions. The shuffler generates a key that describes how to reconstruct the original data from the shuffled portions. The key may be provided to a user, such as the owner of the data. For example, if the data is medical data, the key may be provided to the patient to whom the data relates. The key may be provided in a physical form (e.g., on a flash memory that the user keeps in his or her possession), or may be provided to the user by maintaining the key for the user (e.g., in a storage area of the user's password-protected account). Reconstructing the data without the key is difficult, so giving the key to the user (or to a small set of entities) guards against misuse of the data. When the user wants to obtain the data, the user provides the key to a reassembler, which obtains the portions from their various sources and uses the key to reconstruct the original data from the different portions.

When the data is divided into portions, some amount of redundancy may be introduced, so that it may be possible to construct all of the original data from fewer than all of the portions. Thus, if one or more of the portions are stored on a device that is later damaged or stolen, it may be possible to reconstruct the original data without those portions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
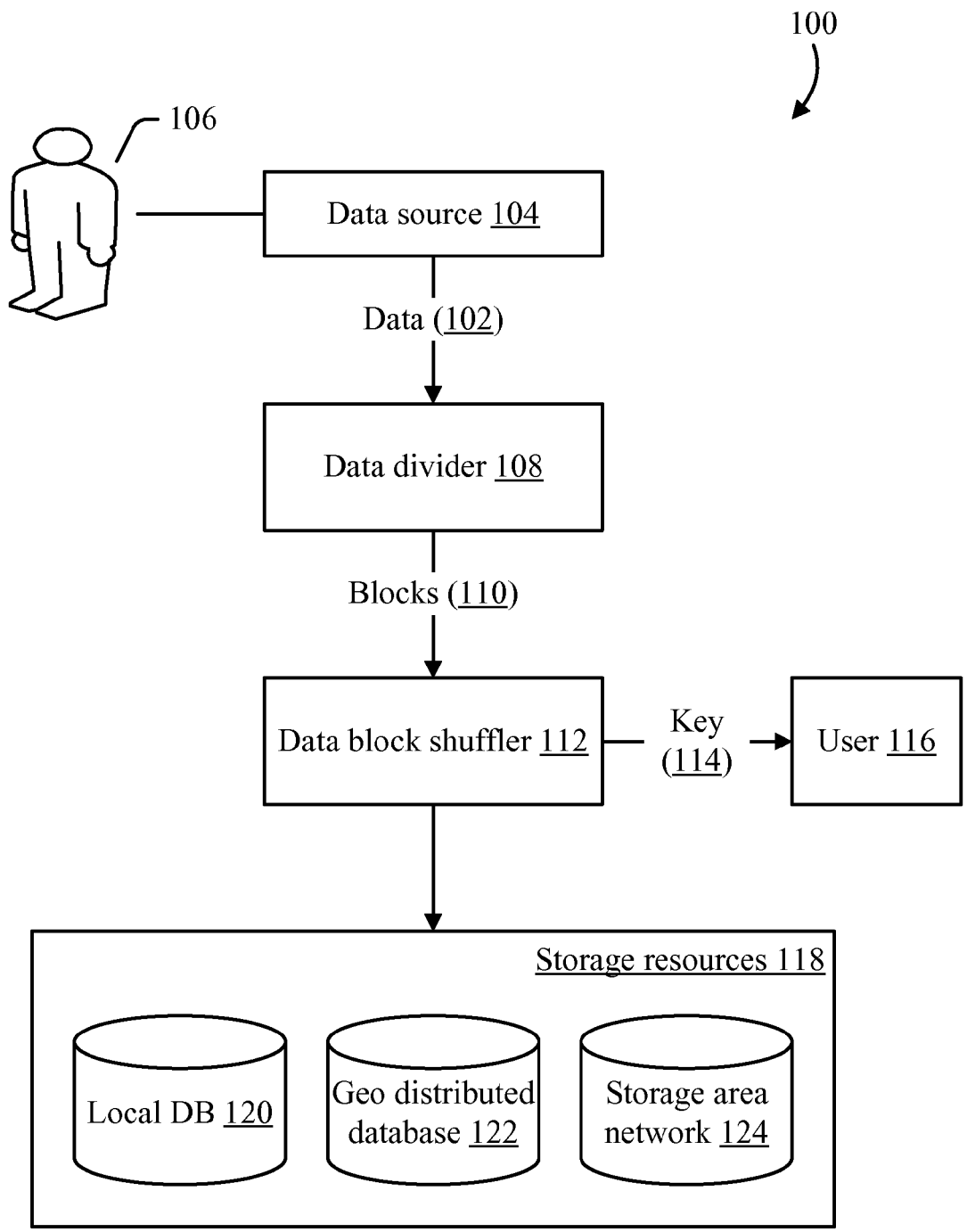
FIG. 1 is a block diagram of an example system in which data may be divided into portions, and in which the portions may be stored.

Some kinds of data are of a private or sensitive nature, so systems that store such data may be designed to protect the data from unauthorized access. Examples of data that have a sensitive or private nature include medical data, financial data, or any other kind of data to which one might want to limit access. Access to data is sometimes limited through the use of access control systems and/or encryption. Access control systems guard data by conditioning access to the data on presentation of appropriate credentials. Encryption systems protect data by making the data indecipherable to those who do not possess a decryption secret.

In addition to preventing unauthorized access to data, another issue that arises in the protection of data is prevention of data loss. One way to protect data from loss is to use some form of redundancy. For example, different copies of the data, or overlapping portions of the data, may be stored in different storage resources, so that if one resource becomes unusable through mechanical failure or theft, the data can be recovered.

The subject matter described herein provides techniques to protect data from unauthorized access and/or loss. The techniques provided herein may use geographically diverse storage resources to disperse the data throughout the world. Data may be divided into portions and distributed to places that are located geographically remotely from each other. In one example, each portion is stored at a geographically distinct location, although other distributions of the data are possible. At the time the data is divided, a reassembly key may be created. The way in which the data is divided either prevents, or makes it highly unlikely, that the data can be reassembled properly outside of the presence of the reassembly key. The key may be managed in such a way as to prevent recovery of the data by unauthorized entities. For example, medical records could be stored using the techniques provided herein, and the reassembly key could be provide to the patient to whom those records pertain (and, possibly, only to that patient).

Additionally, the use of redundancy may prevent total loss of the data in the event that one portion of the data is lost. The way in which the data is divided into portions may cause there to be some overlap among the portions, so that the original data can be constructed from fewer than all of the portions. For example, if data is divided into N portions, and C is an integer such that $1 \leq C < N$, sufficient redundancy may be built into the portions so that the original data can be reconstructed if any N−C of the portions are available.

If the data is dispersed into a large number of portions, and if each portion has sufficient redundancy to allow the original data to be reconstructed from fewer than all of the portions, then the data may be guarded against both theft and loss. For example, at the physical location at which one of the portions of the data is stored, a thief might abscond with the disk drive that contains that one portion. However, in one example, neither the privacy nor availability of the original data may be compromised by the thief's action. The privacy of the data is protected by the fact that the thief lacks the reassembly key. The availability of the data is protected by the redundancy across the various portions of the data, thereby allowing the data to be reconstructed even without the portion with which the thief has absconded.

Turning now to the drawings, FIG. 1 shows an example system 100 in which data may be divided into portions, and in which the portions may be stored.

Data 102 may be provided by a data source 104. Data 102 could be any kind of data, and data source 104 could be any source that generates or marshals data 102. In one example, data 102 is medical data, which describes the human body of person 106, or describes a treatment of that person's human body. For example, data 102 could be an X-ray of person 106's body or a portion thereof, in which case data source 104 may be an X-ray machine. As another example, data 102 could be a video of person 106's body, in which case data source 104 could be some type of medical video equipment, such as an endoscope, an arthroscope, a laparoscope, etc.). As another example, data 102 could be the results of a blood test, in which case data source 104 could be appropriate laboratory equipment that is used to evaluate a blood sample. The foregoing are some examples from the medical field, although data 102 is not limited to medical data. Rather, data 102 could be financial data, scientific data, text, video, audio, or any other kind of data.

Data divider 108 is a component that divides data 102 into blocks 110. Each of blocks 110 may represent a portion of data 102. There may be some form of redundancy across blocks 110, in order to allow data 102 to be reconstructed from fewer than all of the blocks, as more particularly described below.

Data block shuffler 112 is a component that receives blocks 110. Data block shuffler performs a type of encryption on blocks 110 by rearranging the contents of blocks 110. Data block shuffler 112 may rearrange the contents within a single block, or may rearrange contents across blocks by moving data between different blocks. Data block shuffler 112 may rearrange the content of blocks in any manner, and may generate a key 114. Key 114 describes how blocks 110 have been rearranged by data block shuffler 112, so that the original contents of the blocks may be reconstructed. Thus, key 114 acts as a type of decryption key, in the sense that the blocks, as rearranged by data block shuffler 112, are typically indecipherable, but can be deciphered in the presence of key 114. If one has access to the rearranged blocks and key 114, then one can use key 114 to reconstruct the contents of the blocks. Additionally, due to the redundancy that may be built into blocks 110, it may be possible to reconstruct the original contents of the blocks using key 114 and fewer than all of the blocks. (The minimum number of blocks that may be used to reconstruct the original data depends on how much redundancy is built into the blocks. As noted above, if the data is divided into if data is divided into N portions, then the data typically can be reconstructed from N–C of those portions, where 1≤C<N. The specific value of C depends on how much redundancy is included in the various blocks.)

In order to restrict access to data, access to key 114 is typically limited. For example, if data 102 belongs to a particular user 116, then key 114 may be provided to that user, as a way to ensure that the data is only viewed by user 116, or is only viewed with user 116's authorization. Key 114 could be given to user 116 to hold physically on a memory or storage devices—e.g., key 114 could be written to a flash memory or optical disk that user 116 keeps in his possession. As another example, user 116 may maintain an account (e.g., a password-protected account with an on-line service), and the key may be stored by that service. For example, data 102 could be medical data belonging to user 116, and user 116 might subscribe to an on-line service that user 116 uses to manage his or her medical records. User 116 may have a password-protected account with that service. When data 102 is encrypted, key 114 may be provided to the user in the sense that the data is stored by the service, and access to the key is gated by the user's password-protected account. Thus, the service might use key 114 to reconstruct the data when user 116 has tendered his or her password and is properly logged into his account. The foregoing are some examples of how key 114 could be provided to user 116, although key 114 could be provided to user 116 in any manner.

After the blocks have been created and shuffled, they may be stored in one or more storage resources 118. Some examples of storage resources include local database 120, geographically-distributed database 122, or storage area network 124.

Local database 120 may comprise one or more disks, tapes, etc., that exist on a local machine. For example, if data divider 108 and data block shuffler 112 are part of a program that executes on a particular machine, local database 120 may be one or more files that reside on that machine's local disks. Geographically-distributed database 122 may comprise disks on one or more machines that are connected by a network and are geographically distant from each other. Storage area network may comprise a single logical drive that maps to physical disks on several machines. The machines may be close to each other or far apart. In one example, storage area network 124 comprises a logical drive that maps to physical disks on machines that are geographically-distant from each other. However, in another example, storage area network 124 is comprises a logical drive that maps to physical disks on machines that are close to each other (e.g., in one room, in one building, etc.). These two configurations may be referred to as a "geographically-distributed storage area network" and a "local storage area network," respectively.

Figure 2:
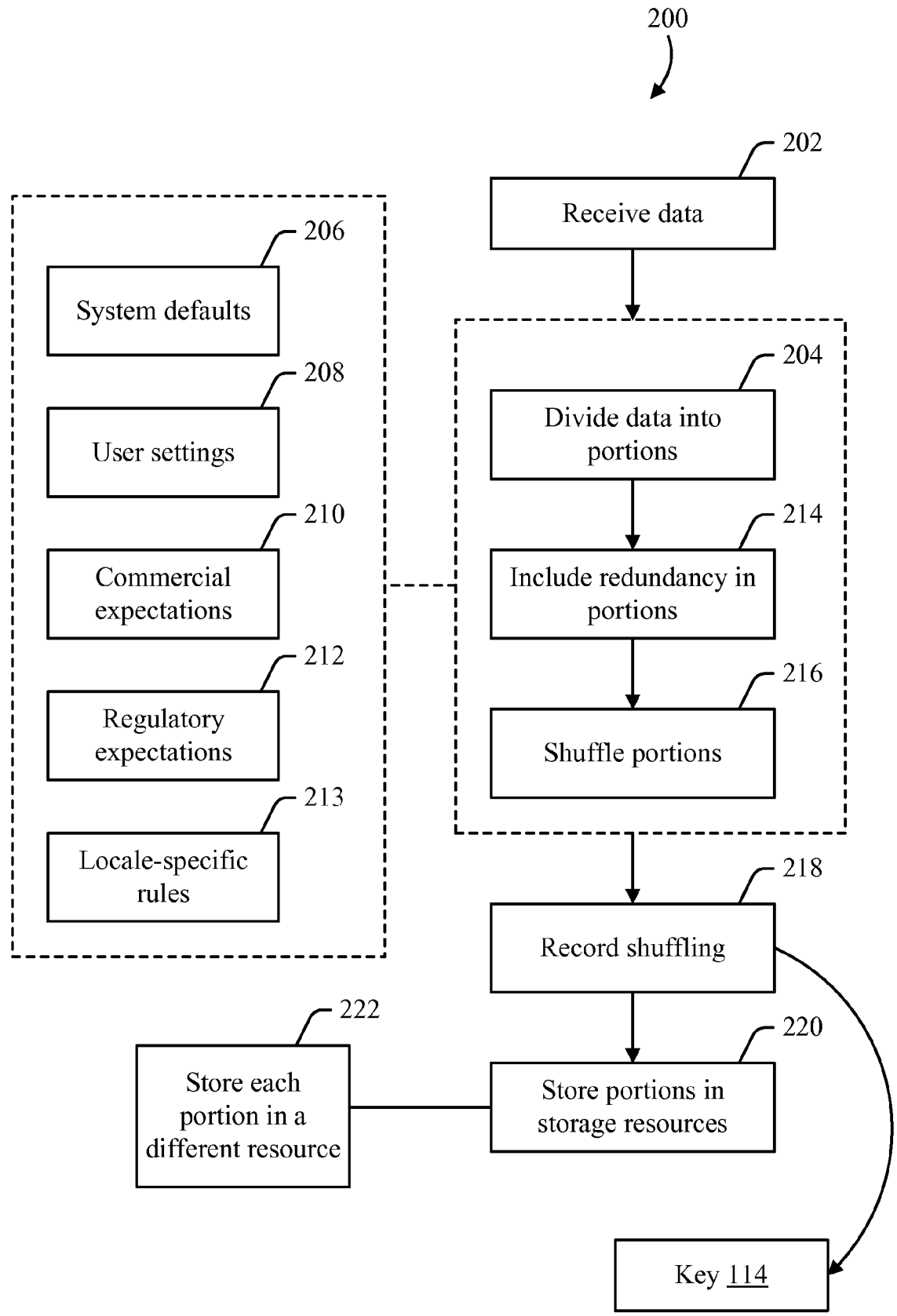
FIG. 2 is a flow diagram of an example process in which data may be divided into portions and stored.

FIG. 2 shows an example process 200 in which data may be divided into portions and stored. Before turning to a description of FIG. 2, it is noted that each of the flow diagrams contained herein (both in FIG. 2 and in FIG. 4) shows an example in which stages of a process are carried out in a particular order, as indicated by the lines connecting the blocks, but the various stages shown in these diagrams can be performed in any order, or in any combination or sub-combination.

At 202, data is received. At 204, the data is divided into portions. The number of portions into which the data is divided may be controlled by various factors, such as system defaults 206, user settings 208, commercial expectations 210, regulatory expectations 212, local-specific rules 213, or any other factors. The size of the portions could also be controlled by such factors. That is, system defaults, user settings, commercial or regulatory expections, etc., may specify a specific portions size into which data is to be divided. Or those factors could be used to specify a range of sizes, so that a given piece of data could be divided into portions having variable sizes that fall within the specified range, and where the size of each portion is chosen based on a formula or at random.) Examples of the factors that may be used to determine how data is to be divided (and that may be used to affect other parts of process 200) are described below.

In general, the larger the number of portions into which data is divided, the less likely it is that a thief who comes into possession of one portion would be able to recover meaningful data from that portion. However, dividing the data into a larger number of portions may make management of the data more difficult, since there are a larger number of portions to store, and a larger number of portions to gather when the original data is to be reconstructed. Therefore, some number of portions (or, possibly, a formula for choosing the number of portions based on the size of the data) may be selected, and the choice may be part of system defaults 206. A user may override the default choice, and the user's overriding choice may be reflected in user settings 208. In some cases, the number of portions into which data is to be divided may be derived from commercial expectations 210 and/or regulatory expectations 212. For example, the party that is storing the data may have a contract (e.g., a service level agreement) with the party on whose behalf the data is being stored. That contract may call for the data to be divided into a certain minimum number of portions, in order to decrease the change that a thief could gain valuable information by stealing any one of the portions. The conditions specified in such a contract are an example of commercial expectations. Additionally, legal regulations, or other kinds of laws, may specify the number of portions into which the data is to be divided. For example, the handing of medical data is typically controlled by the national laws of the country in which the medical data is collected. Laws governing the handling of medical data may specify particular aspects of securing the data, including the number of portions into which data is to be divided. Such laws are an example of a regulatory expectation. Additionally, there may be locale-specific rules governing the handling of data. For example, when national law governs the handling of data, the specific way in which data is handled (including the number of portions into which the data is divided, or the specific locations in which the data may or may not be stored) may depend on the country (or other political subdivision) in which the data is created, or from which the storage of the data is initiated.

At 214, redundancy may be included among the portions of the data. For example, each portion of data may contain some overlap with the other portions of the data. The overlap may be added to each portion in such a pattern that, if N portions are created, the original data may be constructed with any N−1 of the portions (or, more generally, with any N−C of the portions, for 1≤C<N). By using redundancy to allow the data to be reconstructed from fewer than all of the portions, it is possible to prevent data loss even in the event that the medium on which one portion is stored is damaged or stolen. The specific type or amount of redundancy may be determined by any of factors 206-212. For example, there may be a default amount of redundancy, which may be overridden by user settings. Moreover, the amount of redundancy may be determined by commercial and/or regulatory expectations, or locale-specific rules.

In the example of FIG. 2, the dividing of data into portions and the introduction of redundancy into the data are shown by separate blocks at 204 and 214. However, the use of separate blocks to show these stages does not imply that that data division and redundancy have to be performed separately. These stages could be performed separately or together. Thus, the process of introducing redundancy could be performed integrally along with the process of dividing the data.

At 216, the portions of data may be shuffled. Shuffling may involve rearranging data within a given portion, and/or exchanging data between portions. Data may be shuffled in various ways, and any of factors 206-212 may be used to determine how the data is to be shuffled. The particular way in which the data has been shuffled is recorded at 218, and the record is represented in the form of key 114. Key 114, as noted above, describes the various portions of data have been rearranged, so that those rearranged portions can be used to reconstruct the original data if key 114 is present. Key 114 could record, in any manner, a description of the shuffling that has taken place. For example, key 114 could describe specific steps that, if followed, would cause the shuffled data to be restored to its original form. Or, key 114 could describe the specific steps that were taken to shuffle the data, so that those steps can later be reversed. Or, as yet another example, key 114 could contain a mapping between the shuffled arrangement of the data and its original arrangement. Any form of key 114 may be used that allows original data to be reconstructed from shuffled data.

At 220, the shuffled portions are stored in various storage resources. Some examples of storage resources 118 are shown in FIG. 1 and are described above. Shuffled portions of data may be distributed across storage resources in any manner. In one example, each portion is stored in a different resource (block 222), so that none of the portions are stored in the same resource. When each portion is stored in a different resource, the possibility of data loss, due to a particular resource being damaged or stolen, is minimized. Some commercial and/or regulatory expectations may specify that the each of the different portions is to be stored in a different resource, in order to minimize the risk of loss. However, the subject matter herein includes situations in which the different portions are distributed across storage resources in any manner, including situations in which some or all of the portions of data are stored in the same storage resource.

Figure 3:
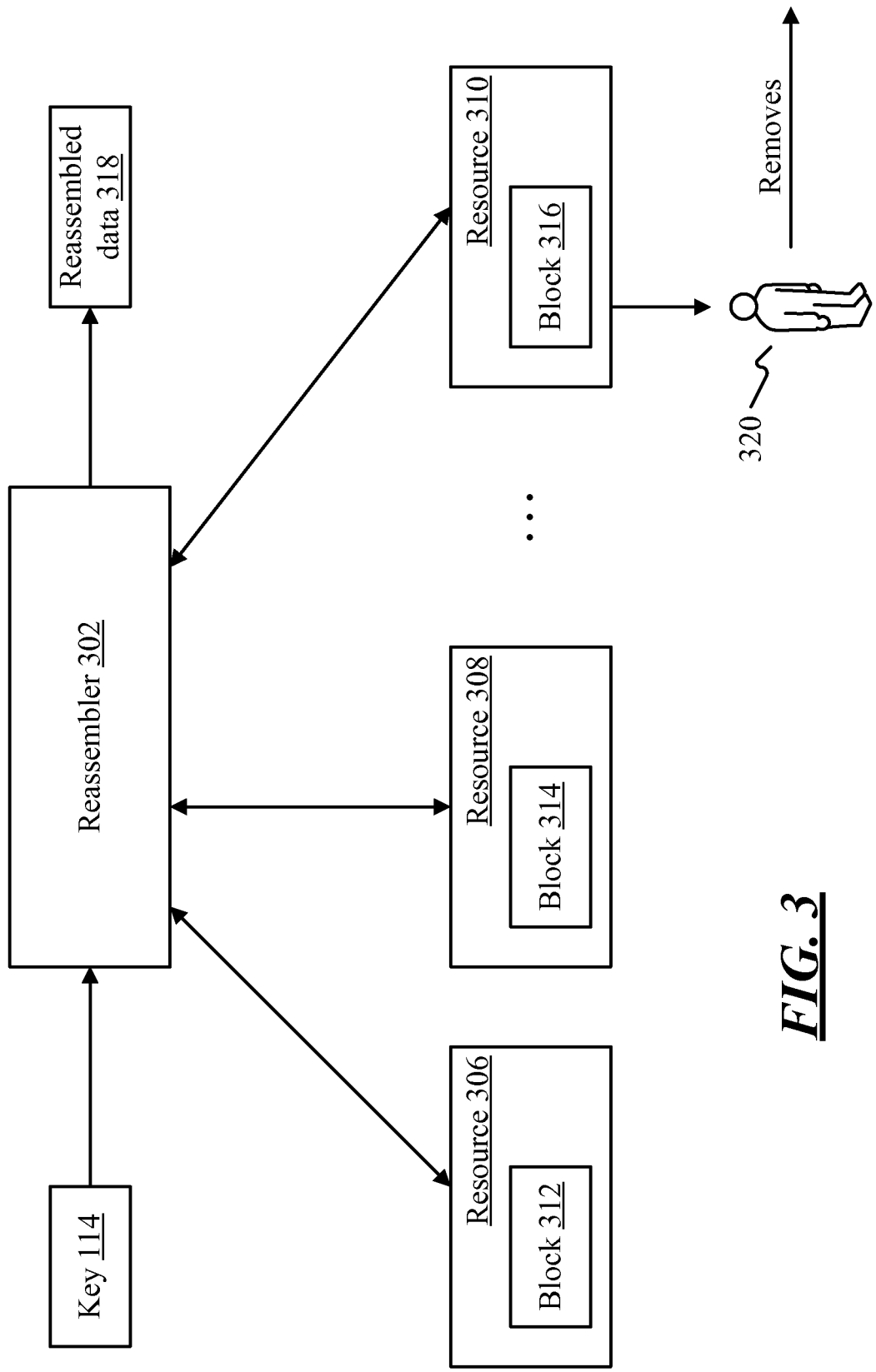
FIG. 3 is a block diagram of an example system that may be used to reconstruct original data from pieces into which the data has been divided.

As described above, data is separated into blocks (or other portions) with a view toward reconstructing the original data at some later time. FIG. 3 shows an example system that may be used to reconstruct original data from the pieces into which it has been divided.

Reassembler 302 is a component that reconstructs original data from its pieces. Reassembler 302 receives key 114, which, as noted above, describes how to reassemble data from the portions into which it has been divided. Additionally, reassembler 302 communicates with various storage resources to retrieve the portions of data. In the example of FIG. 3, the data has been divided into three portions: blocks 312, 314, and 316, which are stored in resources 306, 308, and 310, respectively. (While FIG. 3 shows three storage resources and three portions of data, there could be any number of portions of data and any number of storage resources. Moreover, the number of storage resources might not be the same as the number of portions of data.)

Reassembler 302 may receive blocks 312-316 from the various storage resources. Reassembler 302 may use key 114 to reassemble blocks 312-316 into the original data from which the blocks were derived. (Since the original data is reassembled from the blocks, the original data is labeled as reassembled data 318 in the example of FIG. 3.)

As noted above, it may be the case that one or more portions of data are lost or stolen. Reassembler 302 may be able to reconstruct the original data from fewer than all of the portions, if some amount of redundancy has been built into the portions. In the example of FIG. 3, a person 320, who has access to storage resource 310, removes that storage resource, thereby rendering block 316 unavailable. For example, person 320 might be a "faithless" administrator who steals storage resource 310. Although block 316 may be unavailable, reassembler 302 still may be able to reconstruct the original data, due to the redundancy in blocks 312 and 314. If blocks 312 and 314 collectively contain representations of the data that is in block 316, then the original data may be reconstructed without access to block 316.

Figure 4:
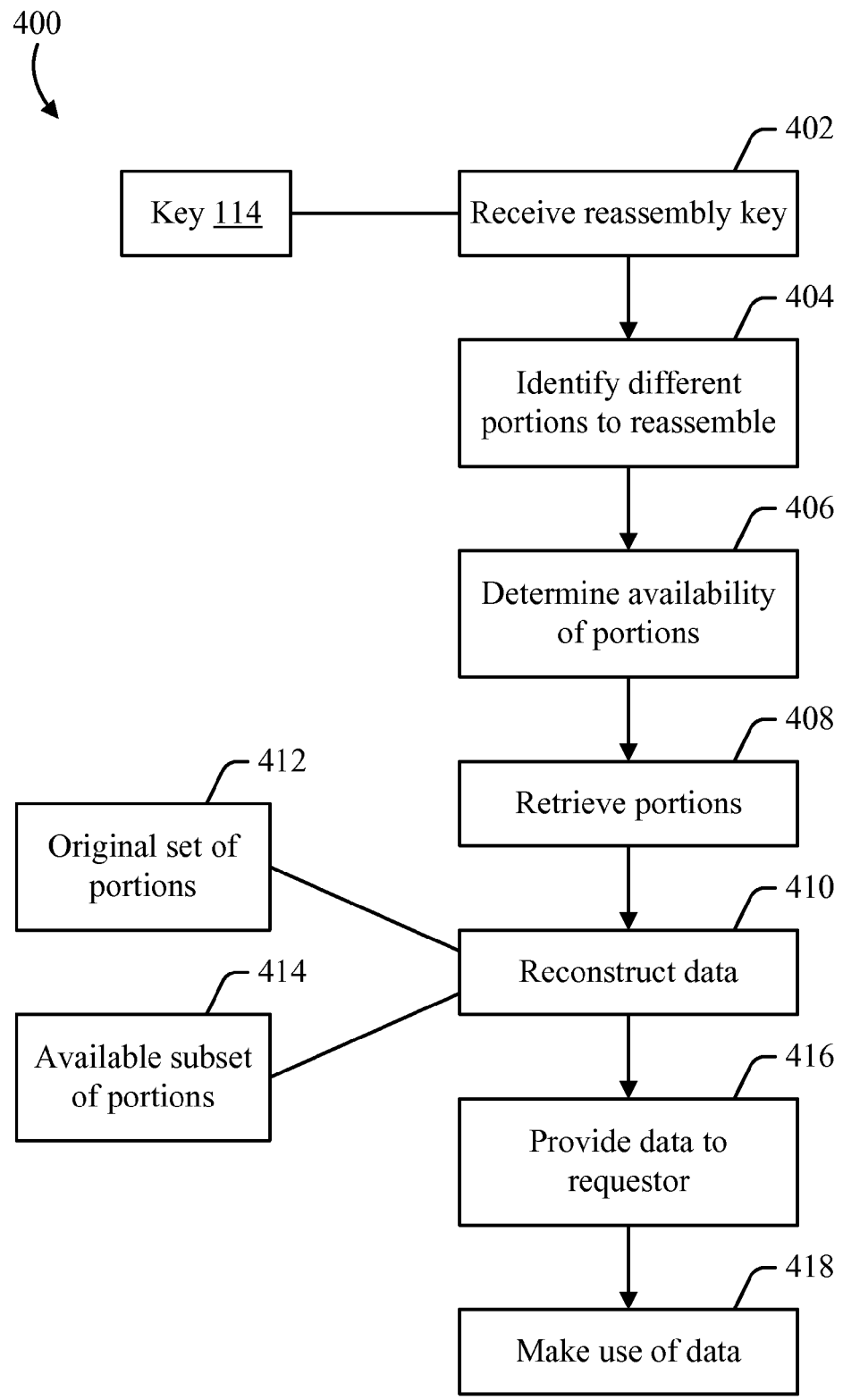
FIG. 4 is a flow diagram of an example process of reconstructing data.

FIG. 4 shows, in the form of a flow chart, an example process 400 of reconstructing data from the various portions into which the data has been divided.

At 402, key 114 is received. Key 114 may be, for example, the reassembly key that was created by data block shuffler 112 (shown in FIG. 1). At 404, the portions of data to be retrieved are identified. As part of the process of identifying those portions, the locations of the portions may also be determined. For example, it may be determined that the data to be reconstructed is stored in five different portions, and that those portions are in five particular data storage resources (possible located at five different places in the world that are distant from each other).

At 406, the availability of the identified portions is determined. As noted above, it is possible that some portions of data are no longer available—e.g., through destruction or theft. Thus, at 406, it is determined which of the portions are available. At 408, the available portions are retrieved.

At 410, process 400 proceeds to reconstruct the original data. If sufficient redundancy has been built into the portions, and if a sufficient number of portions are available, then it may be possible to reconstruct the original data with those portions that are available. Therefore, depending on how many of the portions were successfully retrieved from the resources in which they were stored, reconstruction of the original data may proceed based on the full original set of portions (block 412), or based on an available subset of the portions (414).

After the data has been reconstructed, the reconstructed data is provided to the person or entity that requested reconstruction of the data (at 416). At 418, the entity to which the data is provided may make use of the data. The use of the data may be tangible. Examples of tangible uses include communicating the data in a fixed and tangible form (e.g., on a physically extant magnetic or optical medium). In the example in which the reconstructed data is medical data, one example of a tangible use of the data is to perform medical treatment of a human body based on the data.

Figure 5:
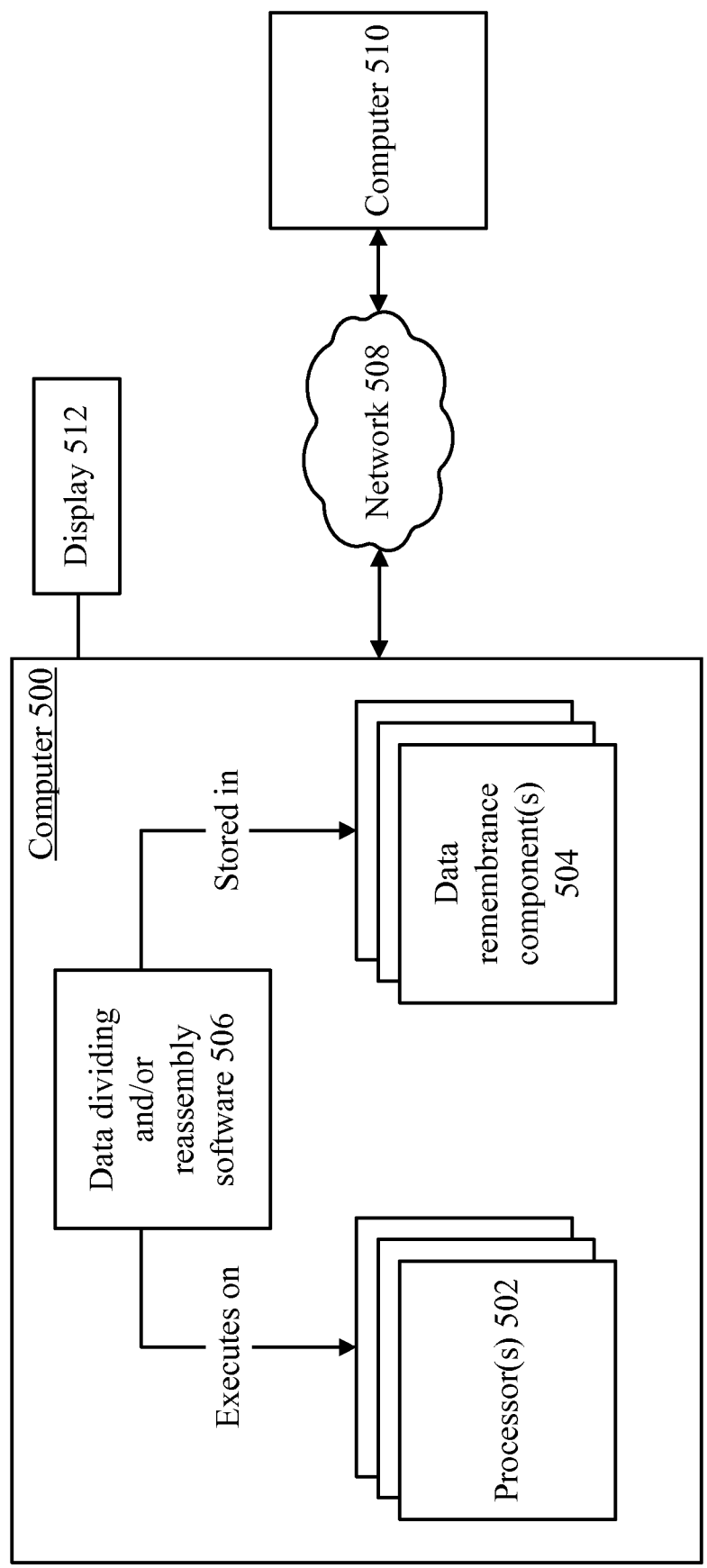
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is data dividing and/or reassembly software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., a personal computer, a server computer, or any other type of computer) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable physical storage devices that store executable instructions that, when executed by a computer, cause the computer to perform acts comprising:
   receiving data;
   dividing said data into portions;
   including redundancy in each of the portions, such that each of the portions contains some information contained in another one of the portions;
   shuffling the portions by rearranging data within a single one of the portions and by moving data between different ones of the portions, said shuffling being a separate act from said dividing act, said shuffling occurring after said dividing such that said shuffling is performed on portions that have been created by said dividing;
   generating a key that describes how the data is to be reassembled from the portions, said key indicating how data in the portions has been rearranged within a portion and moved between portions;
   storing the portions in a plurality of storage resources that are located in geographically distant locations from each other; and
   determining, based on a contract or regulation:
      a first number of portions into which said data is to be divided, said contract or regulation specifying said first number of portions; and
      an amount of redundancy to include among the portions, said contract or regulation specifying said amount of redundancy by specifying a second number that constitutes a maximum number of said potions that are required to reconstruct said data.

2. The one or more computer-readable physical storage devices of claim 1, wherein said storing comprises:
   storing each of the portions in a different one of said storage locations, so that none of the storage locations stores more than one portion.

3. The one or more computer-readable storage media of claim 1, wherein said dividing creates N portions, and wherein said including of said redundancy comprises:
   creating each portion such that information sufficient to reconstruct said data is contained in any combination of N−1 of the portions.

4. The one or more computer-readable physical storage devices of claim 1, wherein the acts further comprise:
   using a system default setting to determine how many portions into which said data is to be divided.

5. The one or more computer-readable physical storage devices of claim 4, wherein the acts further comprise:
   using a user setting to determine how many portions into which said data is to be divided by overriding said system default setting.

6. The one or more computer-readable physical storage devices of claim 1, said determining being based on said contract, said first number of portions and said amount of redundancy being specified by said contract.

7. The one or more computer-readable storage media of claim 1, wherein said data comprises medical data that describes a human body or describes a treatment of said human body.

8. The one or more computer-readable storage media of claim 1, wherein said data belongs to a user, or is created on behalf of a user, and wherein the acts further comprises:
   providing the key to the user and not to any other entity.

9. The one or more computer-readable storage media of claim 8, wherein said user maintains an account to which access is limited such that only said user can access the account, and wherein said providing of the key to the user comprises storing said key in said user's account in a way that limits access to the key to those who have access to the account.

10. The one or more computer-readable storage media of claim 8, wherein said providing of the key to the user comprises providing, to the user, a memory or storage device on which the key is stored.

11. A system to store data, the system comprising:
   one or more processors;
   a data divider that executes on the one or more processors, said data divider receiving data from a data source and dividing said data into a plurality of portions, said data divider including some redundancy in each of the portions such that each of the portions contains some information contained in at least one of the other portions;
   a shuffler that executes on the one or more processors, said shuffler rearranging contents of said portions into shuffled portions by rearranging said contents within a single portion and also by moving said contents between different portions, said shuffler generating a key that describes how to reassemble said shuffled portions into said data and that indicates how said contents have been rearranged within a portion and moved between portions, said shuffler operating on portions that have been created by said data divider such that said shuffler performs said rearranging after said data divider has already created said portions; and
   a plurality of storage resources that store said portions, each of said storage resources being at a location that is geographically distant from every other one of the storage resources,
   the system determining a first number of portions into which to divide said data, and an amount of redundancy in each of the portions, based on a contract or regulation, said contract or regulation specifying said first number of portions into which to divided said data and also specifying said amount of redundancy by specifying a second number that represents a maximum number of said potions that are required to reconstruct said data.

12. The system of claim 11, wherein said shuffler rearranges contents within each of the portions, but does not move contents of one portion to another portion.

13. The system of claim 11, wherein said shuffler moves contents from one of said portions to another one of said portions.

14. The system of claim 11, wherein the system stores each of said portions in a different one of said storage resources, such that none of said storage resources stores more than one portion.

15. The system of claim 11, wherein said data belongs to a user, or is created on behalf of the user, and wherein the system provides the key to the user and not to any other entity.

16. The system of claim 11, said first number of portions into which to divide said and said amount of redundancy in each of the portions being determined based on said contract.

17. The system of claim 11, wherein said data comprises medical data that describes a human body or a treatment of said human body.

18. A method of using data, the method comprising:
   using a processor to perform acts comprising:
      receiving, from a user, a key;
      identifying a plurality of blocks of data, there being N of said blocks;
      retrieving, from a plurality of storage resources, at least some of said blocks of data, each of the plurality of storage resources being located at a geographically distant location from all of the other ones of said plurality of storage resources;
      using said key to reconstruct said data from fewer than N of said blocks, said blocks having been shuffled by rearrangement of data within a single block and by moving data across different blocks, shuffling of said data by said rearrangement and by said moving having being performed on said data after said data had already been divided into blocks, said key describing how said data has been rearranged within a block and how said data has been moved between blocks; and
      providing said data to said user; or
      making a tangible use of said data,
   there being a contract or regulation that specifies:
      a first number of blocks into which said data is to be divided; and
      an amount of redundancy to include among the blocks, said contract or regulation specifying said amount of redundancy by specifying a second number that constitutes a maximum number of said blocks that are required to reconstruct said data.

19. The method of claim 18, wherein said acts further comprise:
   determining that at least one of said blocks is not available to be retrieved.

20. The method of claim 18, said first number of blocks and said amount of redundancy being specified by said contract.

\* \* \* \* \*